US012361446B2

(12) United States Patent
Hollands et al.

(10) Patent No.: US 12,361,446 B2
(45) Date of Patent: Jul. 15, 2025

(54) LIFT REPORTING SYSTEM

(71) Applicant: Snap Inc., Santa Monica, CA (US)

(72) Inventors: Simon Hollands, Venice, CA (US); Li Shi, Culver City, CA (US); Amit Adur, Fullerton, CA (US); Mattia Fumagalli, Brooklyn, NY (US); Crystal Pan, Redwood City, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/328,492

(22) Filed: Jun. 2, 2023

(65) Prior Publication Data
US 2024/0403909 A1 Dec. 5, 2024

(51) Int. Cl.
*G06Q 30/02* (2023.01)
*G06Q 30/0242* (2023.01)

(52) U.S. Cl.
CPC .............. *G06Q 30/0243* (2013.01)

(58) Field of Classification Search
CPC .................................................. G06Q 30/0243
See application file for complete search history.

(56) References Cited

U.S. PATENT DOCUMENTS

| | | | | |
|---|---|---|---|---|
| 11,562,400 | B1 * | 1/2023 | Xu | G06Q 30/0254 |
| 2008/0097821 | A1 * | 4/2008 | Chickering | G06Q 30/02 |
| | | | | 705/7.29 |
| 2017/0140416 | A1 | 5/2017 | Ye et al. | |
| 2021/0264025 | A1 * | 8/2021 | Givental | G06F 18/285 |
| 2021/0304151 | A1 * | 9/2021 | Wadhwa | G06Q 10/1053 |
| 2022/0292239 | A1 * | 9/2022 | Kahraman | G06N 20/00 |
| 2022/0414530 | A1 * | 12/2022 | Cmielowski | G06N 20/00 |

FOREIGN PATENT DOCUMENTS

| | | |
|---|---|---|
| AU | 2013352309 | 5/2015 |
| WO | 2024249779 | 12/2024 |

OTHER PUBLICATIONS

University of Chicago, "Too Many Metrics" (Year: 2016).*
"International Application Serial No. PCT/US2024/031892, International Search Report mailed Sep. 3, 2024", 3 pgs.
"International Application Serial No. PCT/US2024/031892, Written Opinion mailed Sep. 3, 2024", 6 pgs.

* cited by examiner

*Primary Examiner* — Breffni Baggot
(74) *Attorney, Agent, or Firm* — Schwegman Lundberg & Woessner, P.A.

(57) ABSTRACT

A lift reporting system to perform operations that include: accessing user behavior data associated with one or more machine-learned (ML) models, the ML models associated with identifiers; determining causal conversions associated with the ML models based on the user behavior data, the causal conversions comprising values; performing a comparison between the values that represents the causal conversions; determining a ranking of the ML models based on the comparison; and causing display of a graphical user interface (GUI) that includes a display of identifiers associated with ML models.

17 Claims, 11 Drawing Sheets

| SNAPCHAT | | | | | |
|---|---|---|---|---|---|
| SIDE BY SIDE COMPARISON 804 | | | TEST BGID LIFT | CONTROL BGID LIFT | 806 RELATIVE EFFECT |
| DEC 7, 2022 | BGID_1 | APP_INSTALL | 0.25 (0.02, 0.48) | 0.204 (-0.14, 0.55) | 0.225 |
| DEC 7, 2022 | BGID_2 | APP_INSTALL | 0.315 (0.11, 0.52) | 0.192 (-0.17, 0.56) | 0.641 |

FIG. 8

LIFT REPORTING SYSTEM

TECHNICAL FIELD

The present invention relates generally to analysis of user interaction data, and more particularly to conversion tracking within a media distribution platform.

BACKGROUND

A/B testing, also known as split testing, is a method of comparing two versions of something, such as a campaign, or media within a campaign, to determine which one performs better. "Performing better" in the context of A/B testing typically refers to an improvement in a specific metric that is directly related to some desired user behavior. For example, some common metrics used in A/B testing include:

Conversion rate: The percentage of users who complete a desired action, such as making a purchase, filling out a form, or subscribing to a newsletter.

Click-through rate: The percentage of users who click on a specific link or button, such as a call-to-action button or a product image.

Engagement rate: The amount of time users spend on a webpage or app, or the number of pages or screens they view.

Bounce rate: The percentage of users who leave a webpage or app after viewing only one page or screen.

By measuring these metrics for each version of the "thing," we can determine which version is more effective at driving the desired user behavior. For example, if version A of a webpage has a higher conversion rate than version B, we can conclude that version A is more effective at converting users and should be implemented as the new version of the webpage.

In this method, a random sample of users is shown version A of the page or email, while another random sample is shown version B. The performance of each version is then measured based on a specific metric, such as click-through rate or conversion rate, and compared to determine which version is more effective. A/B testing can also be used to test different elements of a webpage or email, such as the layout, color scheme, call-to-action, headline, or product description. By testing these elements, marketers and website owners can gain valuable insights into what works and what doesn't, and make data-driven decisions to improve their conversion rates and user experience. It's important to note that A/B testing requires a large enough sample size to produce statistically significant results. Additionally, it's important to only test one variable at a time to accurately determine which element is causing a change in performance.

"Lift incrementality modeling," or "causal conversion," refers to a statistical method used to measure the impact of a "thing" (i.e., a particular campaign or marketing action) on user behavior. It allows marketers or content creators to determine the extent to which a particular activity, such as a campaign comprising distributed content, may have influenced user behavior and resulted in specific desired outcomes. Typically, the basic idea behind lift incrementality modeling (i.e., causal conversion) is to compare the behavior of a group of users who are known to have been exposed to specific content with the behavior of a control group comprising users who were not exposed to the content. By comparing the two groups, a content creator can isolate the impact of the content and calculate its "lift" with respect to a desired outcome.

In a related field, "attributed conversion" refer to the action of assigning credit for a "conversion" to a specific activity or action, such as exposure to distributed media content, which led to that conversion. In other words, the process of identifying which specific touchpoints or interactions a user had before performing a specific user activity. For example, if a user was exposed to media content, and based on the exposure to the media content clicked through to a particular website, or visited a specific location associated with the media content, then the attributed conversion would credit the media content with driving the user activity.

Machine Learning (ML) models are algorithms that enable computers to learn and improve from experience without being explicitly programmed. In the context of content distribution, ML models can analyze large amounts of data to identify patterns and make predictions about what content will perform best for a particular audience. For example, advertising and other content distribution platforms may use ML models to optimize content targeting, bidding strategies, and creative design for better performance.

Certain platforms may optimize ML models (and other software updates) by using A/B testing that is based on metrics that are generated through click and view through conversion attributions. However, increasingly, advertisers are interested in casual/incremental performance, which is not captured by the attribution methods which are currently being used.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 8 illustrates an aspect of the subject matter in accordance with one embodiment.

DETAILED DESCRIPTION

Figure 1:
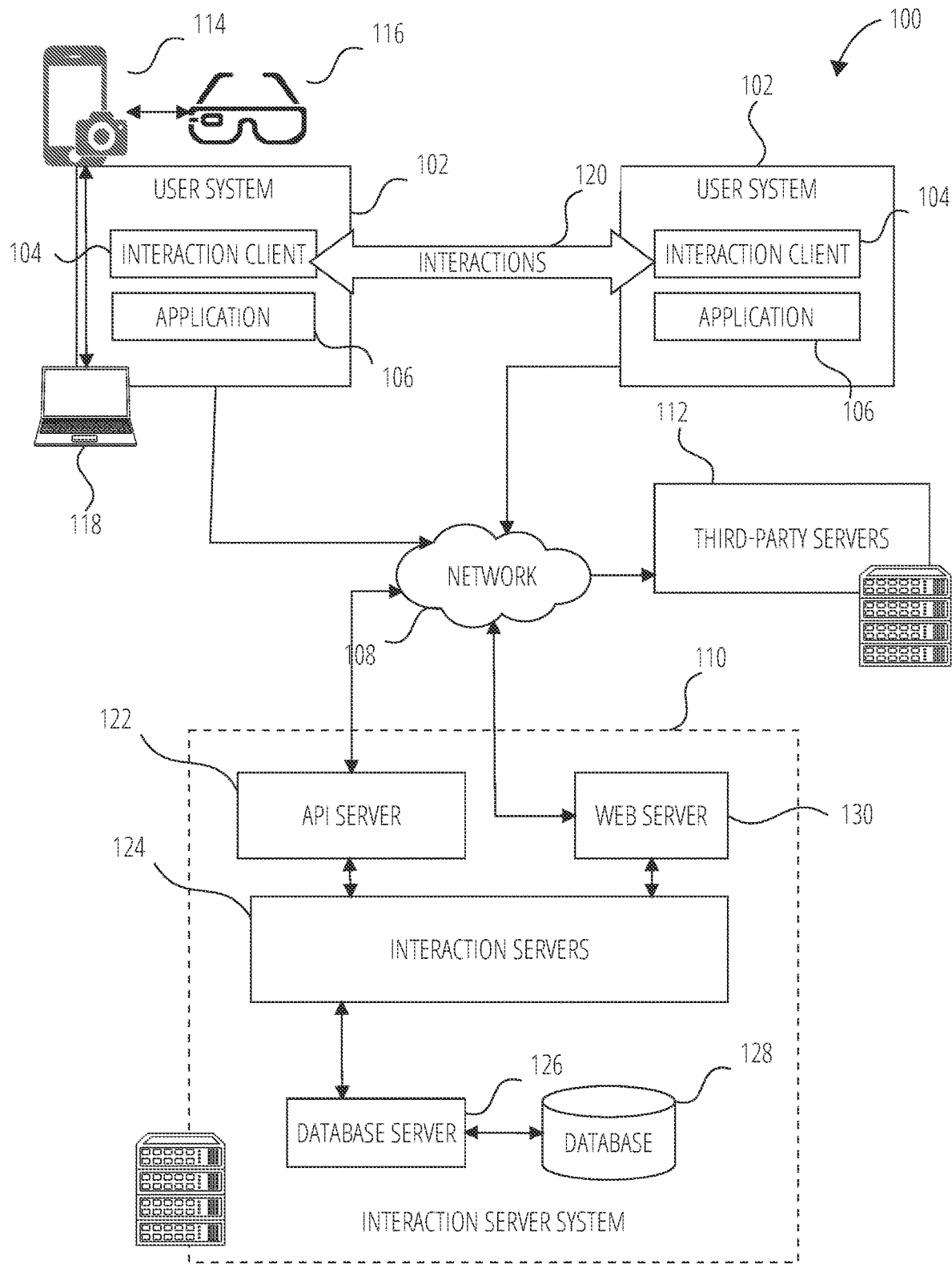
FIG. 1 is a diagrammatic representation of a networked environment in which the present disclosure may be deployed, according to some examples.

As discussed above, various systems may make use of A/B testing to compare two versions of a campaign which may comprise media content with slight variations to determine which campaign performs better. Increasingly, content creators are interested in the causal/incremental performance of their content, which is not typically captured by existing lift reporting systems, which measure performance based on attributed conversions. This creates a problem whereby content is created and distributed by optimizing towards performance metrics which are not necessarily the most important to the content creators. The disclosed invention addresses this shortcoming by providing a new set of reports and metrics for A/B testing that are based on causal effects of ads.

According to certain embodiments, a lift reporting system is configured to perform operations that include: accessing first user behavior data associated with a first machine-learned (ML) model and second user behavior data associated with a second ML model, the first ML model associated with a first identifier and the second ML model associated with a second identifier; determining a first set of causal conversions associated with the first ML model based on the first user behavior data, the first set of causal conversions comprising a first value; determining a second set of causal conversions associated with the second ML model based on the second user behavior data, the second set of causal conversions comprising a second value; performing a comparison between the first value that represents the first set of causal conversions and the second value that represents the second set of causal conversions; determining a ranking of the first ML model and the second ML model based on the comparison; and causing display of a graphical user interface (GUI) that includes a display of the first identifier associated with the first ML model and the second identifier associated with the second ML model based on the ranking.

According to certain example embodiments, the lift reporting system may access the user behavior data based on inputs received vi a GUI presented at a client device. For example, the system may generate and cause display of one or more menu elements within the GUI, wherein the one or more menu elements comprise a display of identifiers that correspond with one or more ML models trained to identify relevant users to distribute media content to. The system may thereby receive one or more inputs that select identifiers, such as the first identifier that identifies the first ML model, and the second identifier that identifies the second ML model, from within the menu elements. Based on the inputs that select the identifiers, the system may access a database to retrieve the first user behavior data and the second user behavior data.

According to certain example embodiments, the display of the first identifier associated with the first ML model and the second identifier associated with the second ML model may be presented within a table that lists a plurality of identifiers associated with ML models which may be accessed by the system. For example, the system may maintain a repository that comprises ML models trained to identify candidates for inclusion in one or more campaigns to distribute media content. Accordingly, the table may further comprise a presentation of the first value and the second value, wherein the first value and the second value represent causal conversions associated with each ML model.

According to certain example embodiments, the lift reporting system may generate and display a visualization of a comparison of causal conversion rates associated with each ML model, wherein the visualization may include a bar graph, pie chart, line graph, or other similar data visualization type.

According to certain example embodiments, the lift reporting system may determine the causal conversions associated with each ML model based on a conversion matching system. The conversion matching may analyze user interaction data to identify which campaign events led to a desired action, including but not limited to: a purchase; a sign-up; or a download. The conversion matching system may track user behavior across multiple channels, such as website visits, email campaigns, social media ads, and mobile apps, and then match those user interactions with a desired action, using techniques such as cookie tracking, device ID matching, and other identifiers.

According to certain example embodiments, the lift reporting system may be configured to apply or otherwise implement an ML model to a campaign, whereby implementing the ML model to a campaign may include identifying a set of candidate users to be exposed to the campaign based on the selected ML model. Accordingly, in some embodiments, upon determining that the second value that corresponds with the second ML model is greater than the first value that corresponds with the first ML model, the system may implement the second ML model with a campaign to distribute media content, such that candidate users to receive content associate with the campaign are identified based on the second ML model.

According to certain example embodiments, the lift reporting system may compare causal conversions associated with ML models by performing A/B testing. This is done by randomly assigning users to either version of the campaign, and measuring the results of the campaign. A/B testing allows advertisers to make data-driven decisions and optimize their campaigns for better performance.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

System Architecture

Figure 2:
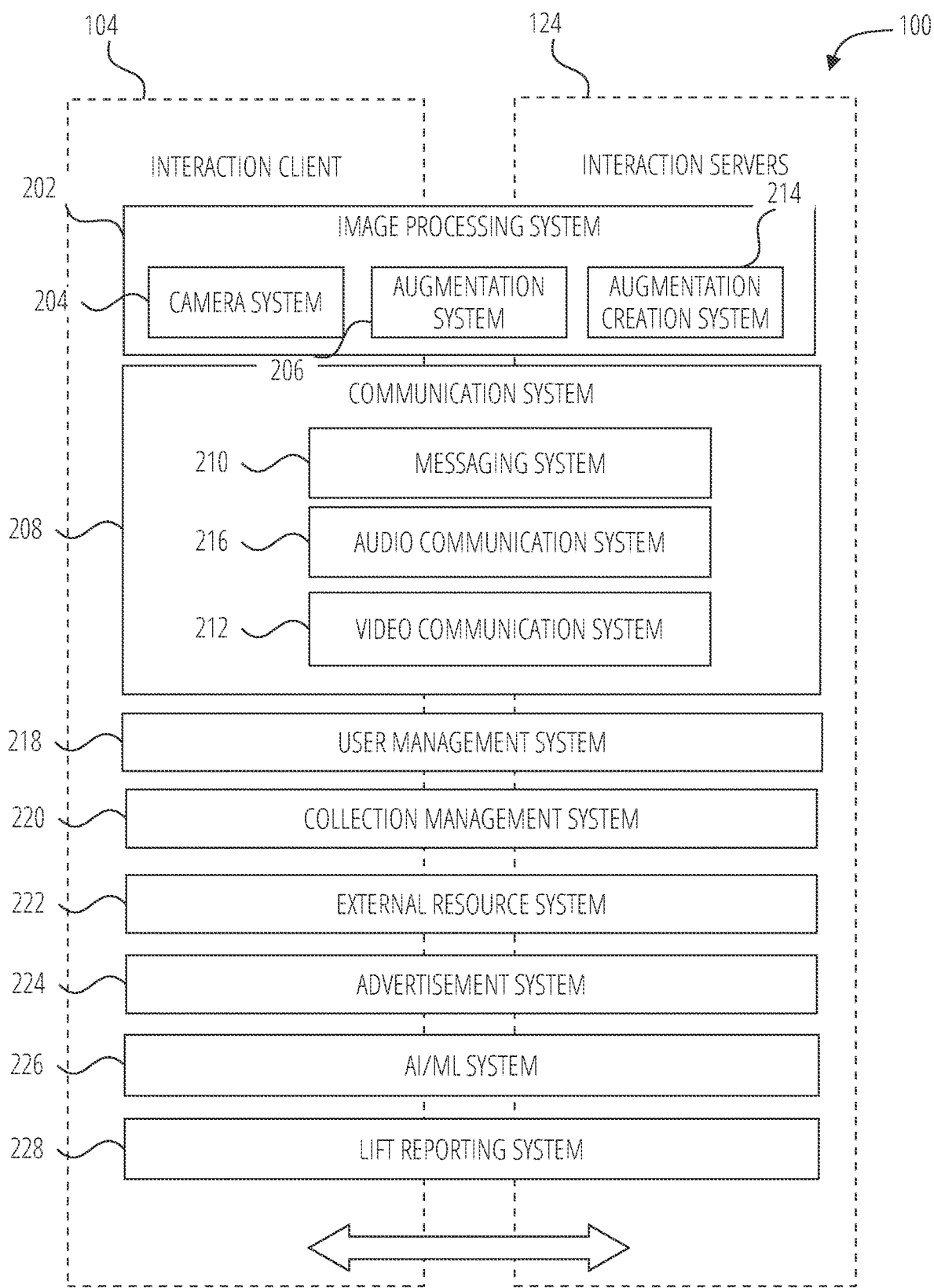
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

An external resource system 222 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 224 operationally enables the purchasing of advertisements by third parties for presentation to end-users via the interaction clients 104 and also handles the delivery and presentation of these advertisements.

An artificial intelligence and machine learning system 226 provides a variety of services to different subsystems within the interaction system 100. For example, the artificial intelligence and machine learning system 226 operates with the image processing system 202 and the camera system 204 to analyze images and extract information such as objects, text, or faces. This information can then be used by the image processing system 202 to enhance, filter, or manipulate images. The artificial intelligence and machine learning system 226 may be used by the augmentation system 206 to generate augmented content and augmented reality experiences, such as adding virtual objects or animations to real-world images. The communication system 208 and messaging system 210 may use the artificial intelligence and machine learning system 226 to analyze communication patterns and provide insights into how users interact with each other and provide intelligent message classification and tagging, such as categorizing messages based on sentiment or topic. The artificial intelligence and machine learning system 226 may also provide chatbot functionality to message interactions 120 between user systems 102 and between a user system 102 and the interaction server system 110. The artificial intelligence and machine learning system 226 may also work with the audio communication system 216 to provide speech recognition and natural language processing capabilities, allowing users to interact with the interaction system 100 using voice commands. The artificial intelligence and machine learning system 226 may also work with the lift reporting system 228 to provide and maintain one or more ML models configured to identify relevant candidate users for exposure to a campaign based on one or more desired user actions that may be input to the artificial intelligence and machine learning system 226.

A lift reporting system 228 is configured to perform operations that include: accessing first user behavior data associated with a first ML model and second user behavior data associated with a second ML model, the first ML model associated with a first identifier and the second ML model associated with a second identifier; determining a first set of causal conversions associated with the first ML model based on the first user behavior data, the first set of causal conversions comprising a first value; determining a second set of causal conversions associated with the second ML model based on the second user behavior data, the second set of causal conversions comprising a second value; performing a comparison between the first value that represents the first set of causal conversions and the second value that represents the second set of causal conversions; determining a ranking of the first ML model and the second ML model based on the comparison; and causing display of a GUI that includes a display of the first identifier associated with the first ML model and the second identifier associated with the second ML model based on the ranking.

Data Architecture

Figure 3:
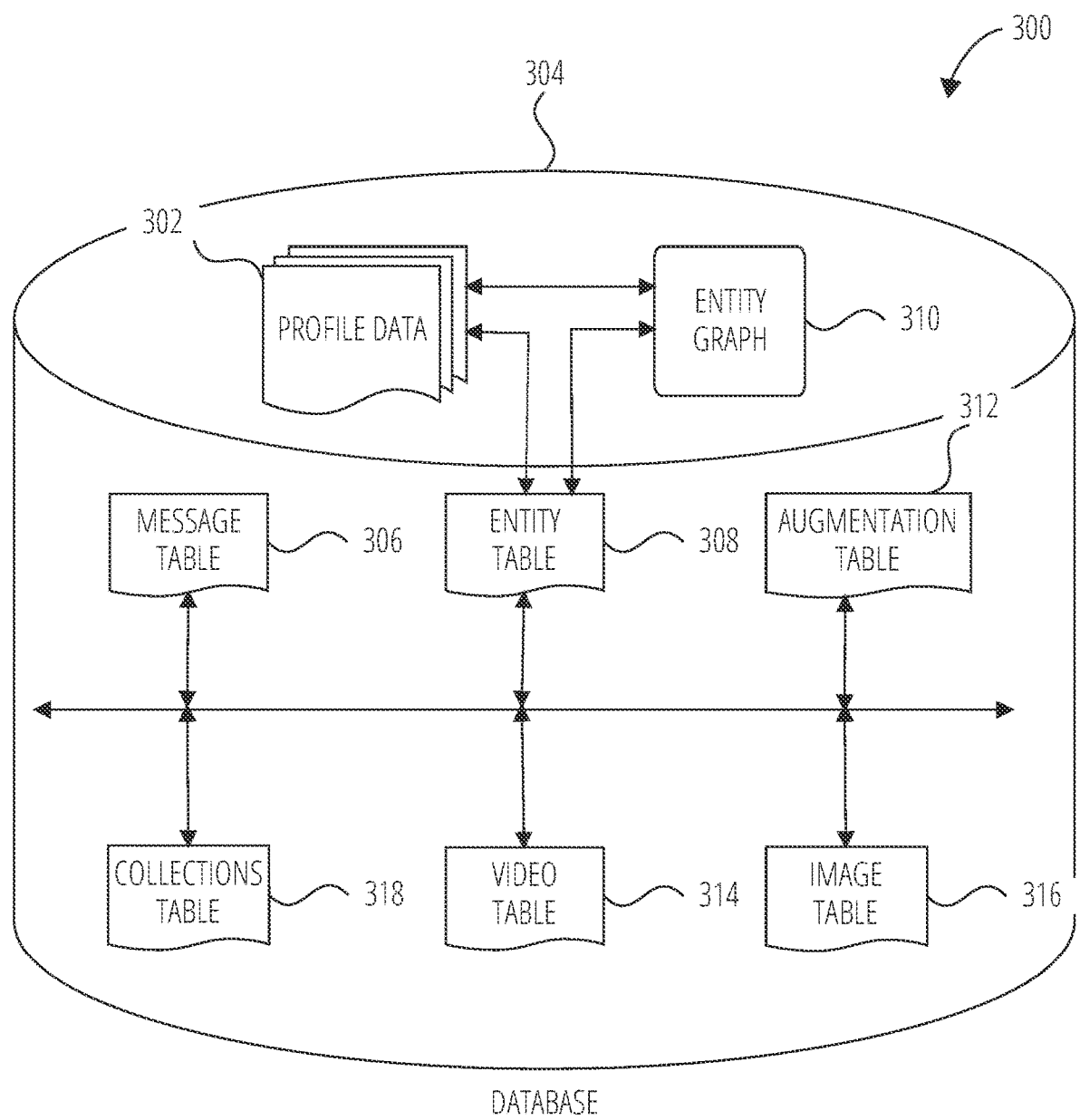
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also includes one or more ML models, such as ML models generated by the artificial intelligence and machine learning system 226.

Figure 4:
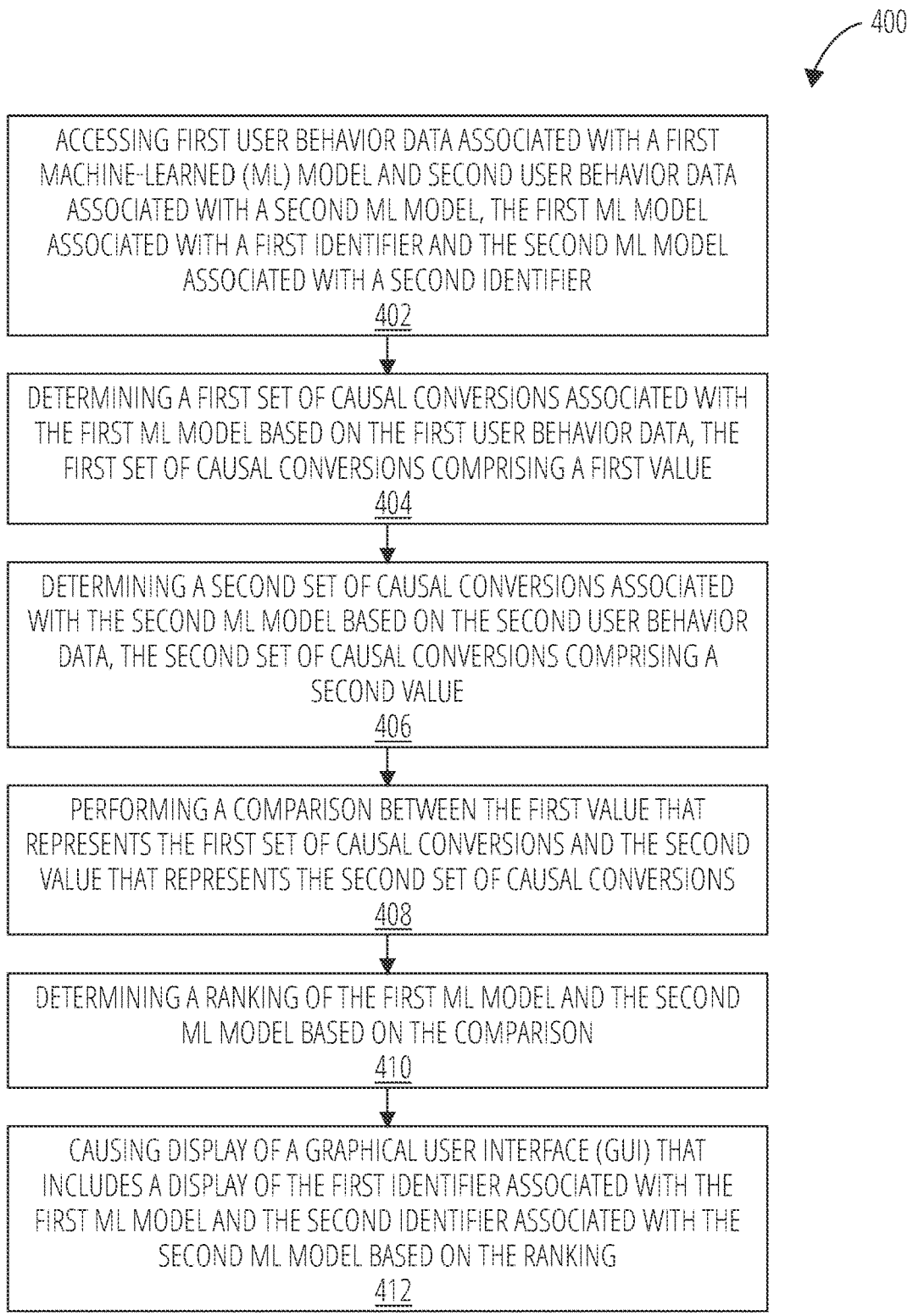
FIG. 4 illustrates an aspect of the subject matter in accordance with one embodiment.

FIG. 4 is a flowchart illustrating operations of a lift reporting system 228 in performing a method 400 for ranking ML models based on user interaction data, in accordance with one embodiment. Operations of the method 400 may be performed by one or more subsystems of the messaging system 100 described above with respect to FIG. 2, such as the lift reporting system 228 and the artificial intelligence and machine learning system 226. As shown in FIG. 4, the method 400 includes one or more operations 402, 404, 406, 408, 410, and 412.

At operation 402, the lift reporting system 228 accesses first user behavior data associated with a first ML model and second user behavior data associated with a second ML model, the first ML model associated with a first identifier and the second ML model associated with a second identifier.

At operation 404, the lift reporting system 228 determines a first set of causal conversions associated with the first ML model based on the first user behavior data, wherein the first set of causal conversions comprise a first value. At operation 406, the lift reporting system 228 determines a second set of causal conversions associated with the second ML model based on the second user behavior data, wherein the second set of causal conversions comprise a second value.

At operation 408, the lift reporting system 228 performs a comparison between the first value that represents the first set of causal conversions and the second value that represents the second set of causal conversions. In some embodiments, performing the comparison may include performing an A/B test based on the user behavior data associated with the first ML model and the second ML model.

At operation 410, the lift reporting system 228 determines a ranking of the first ML model and the second ML model based on the comparison, and at operation 412, causes display of a GUI that includes a display of the first identifier associated with the first ML model and the second identifier associated with the second ML model based on the ranking.

Figure 5:
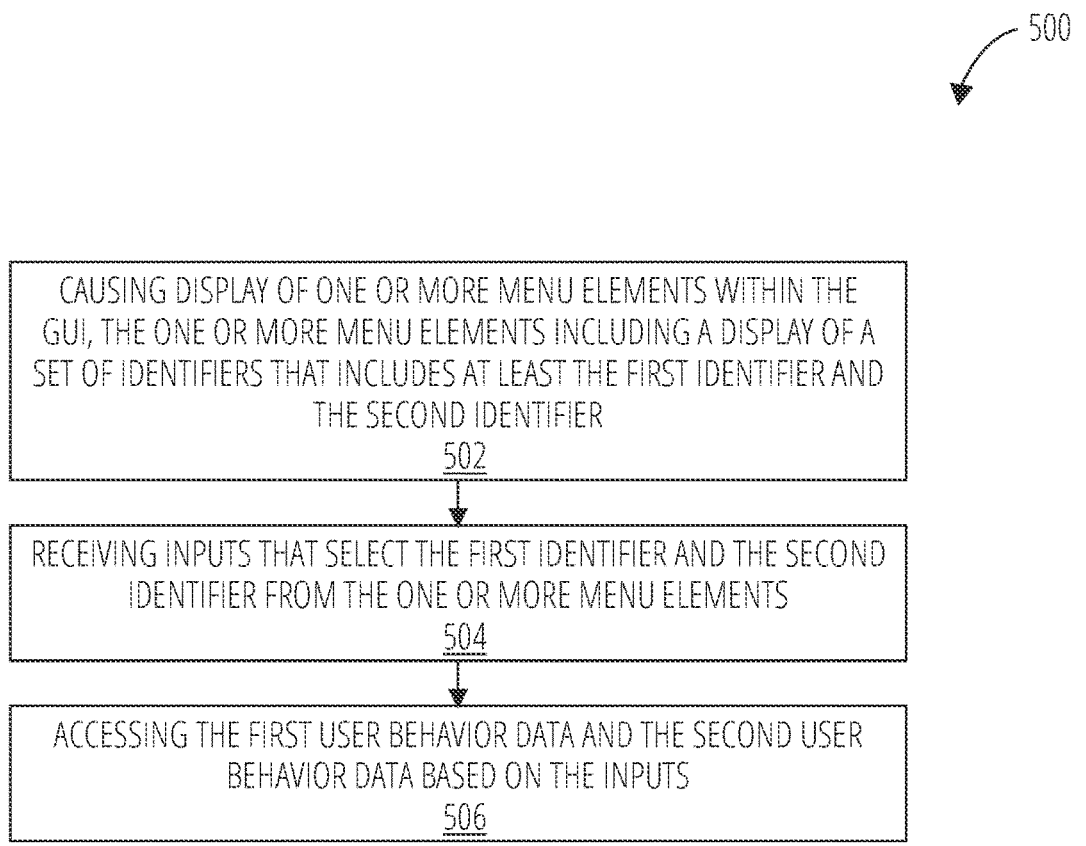
FIG. 5 illustrates an aspect of the subject matter in accordance with one embodiment.

FIG. 5 is a flowchart illustrating operations of a lift reporting system 228 in performing a method 500 for ranking ML models based on user interaction data, in accordance with one embodiment. Operations of the method 500 may be performed by one or more subsystems of the messaging system 100 described above with respect to FIG. 2, such as the lift reporting system 228. As shown in FIG. 5, the method 500 includes one or more operations 502, 504, and 506.

At operation 502, the lift reporting system 228 causes display of one or more menu elements within a GUI, wherein the one or more menu elements include a display of a set of identifiers that include at least a first identifier that identifies the first ML model and a second identifier that identifies the second ML model.

At operation 504, the lift reporting system 228 receives inputs that select the first identifier and the second identifier from the one or more menu elements. For example, a user may provide a tactile input into a client device that selects the first identifier and the second identifier.

At operation 506, the lift reporting system 228 accesses the first user behavior data and the second user behavior data from the databases 304 responsive to the inputs that select the identifiers.

Figure 6:
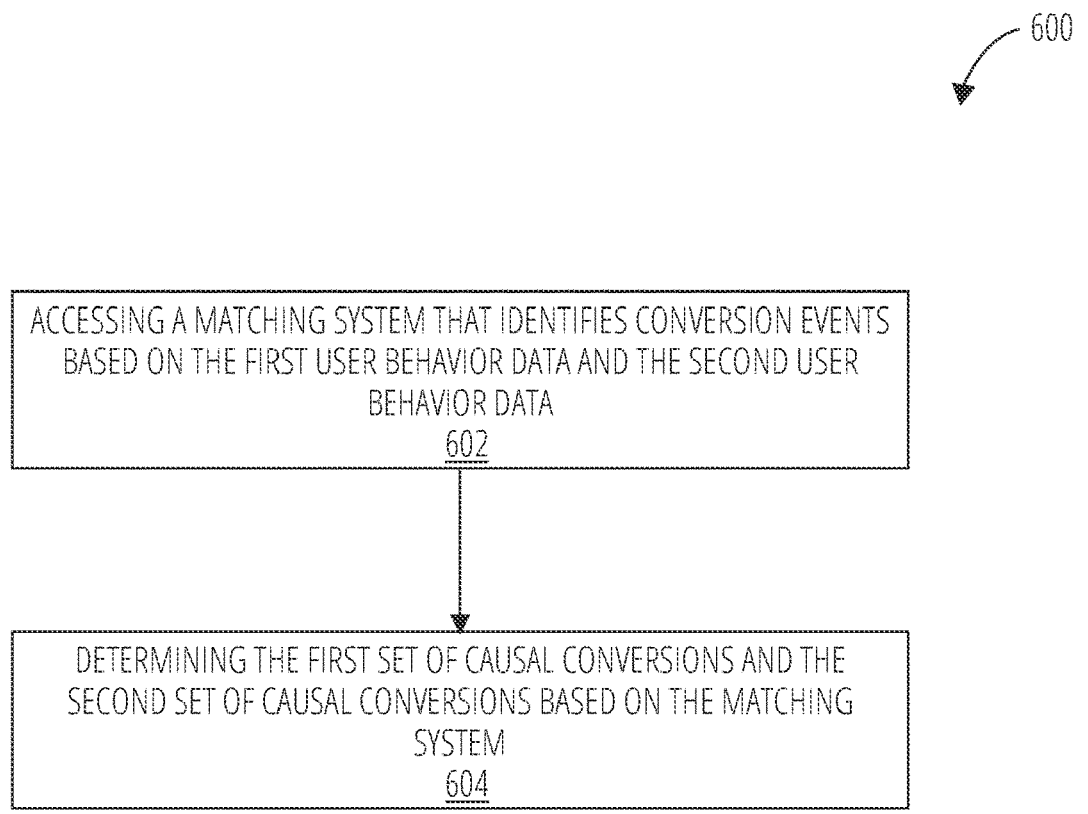
FIG. 6 illustrates an aspect of the subject matter in accordance with one embodiment.

FIG. 6 is a flowchart illustrating operations of a lift reporting system 228 in performing a method 600 for ranking ML models based on user interaction data, in accordance with one embodiment. Operations of the method 600 may be performed by one or more subsystems of the messaging system 100 described above with respect to FIG. 2, such as the lift reporting system 228. As shown in FIG. 6, the method 600 includes one or more operations 602 and 604.

At operation 602, the lift reporting system 228 accesses a matching system configured to identify conversions event based on the first user behavior data and the second user behavior data.

At operation 604, the lift reporting system 228 determines a first set of causal conversions and a second set of causal conversions based on the matching system and the use behavior data. The first set of causal conversions and the second set of causal conversions may comprise a value indicating a total number of causal conversions associated with each ML model.

Figure 7:
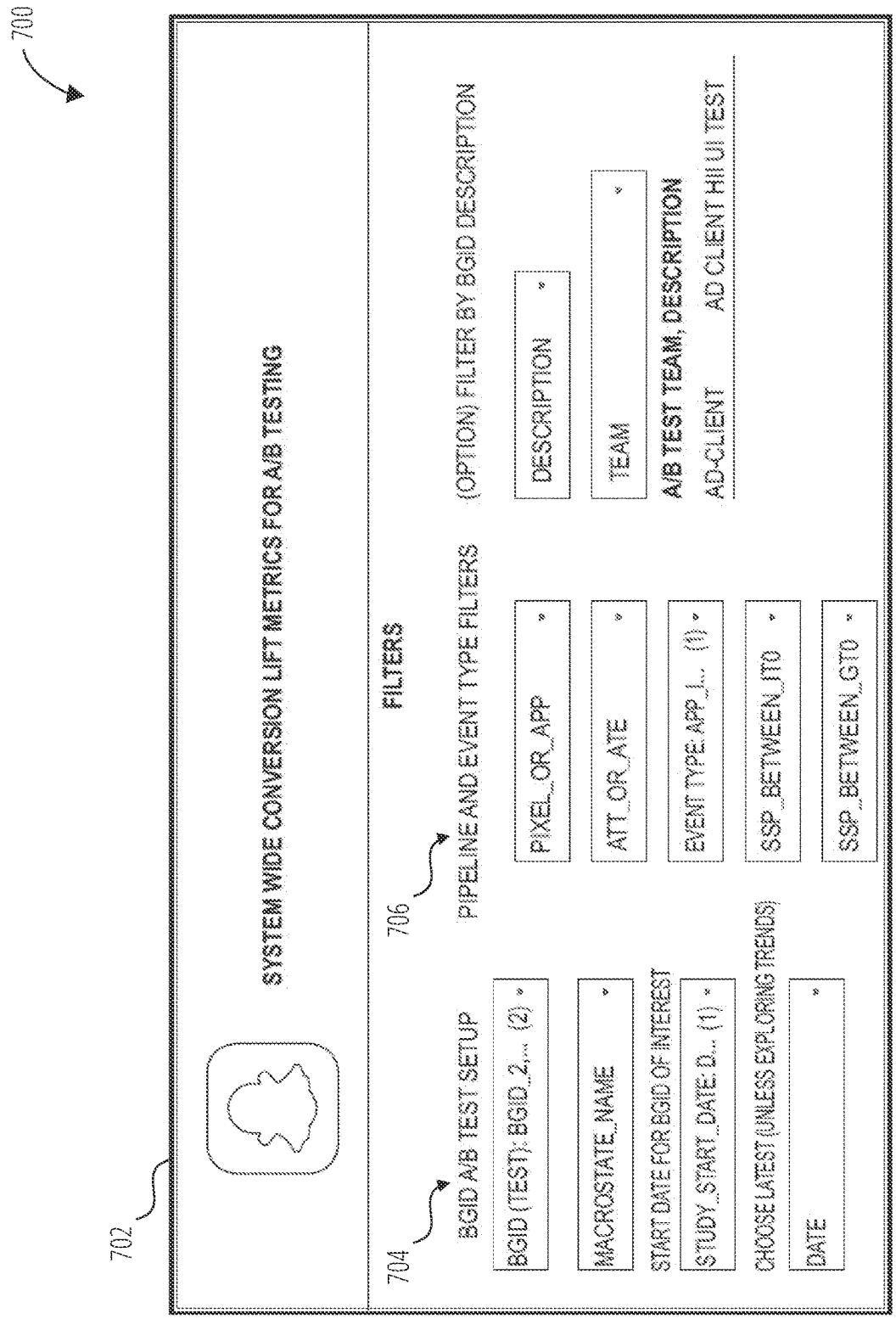
FIG. 7 illustrates an aspect of the subject matter in accordance with one embodiment.

FIG. 7 is an interface diagram 700 depicting a GUI 702 presented by a lift reporting system 228, in accordance with one embodiment. As seen in the interface diagram 700, the GUI 702 may include a display of one or more menu elements 704 and 706, configured to receive inputs from a user of a client device.

For example, in some embodiments a user may provide inputs to select one or more identifiers that identify ML models generated or otherwise maintained by the artificial intelligence and machine learning systems 226 from within the one or more menu elements 704, and an input that selects one or more conversion event types from within the one or more menu elements 706 in order to cause the lift reporting system 228 to perform a comparison between causal conversion rates associated with the selected ML models.

FIG. 8 is an interface diagram 800 depicting a GUI 802 presented by a lift reporting system 228, in accordance with one embodiment. As seen in the interface diagram 800, the GUI 802 may include a ranked display of identifiers associated with selected ML models, such as the identifiers 804.

In some embodiments, the ranked display of the identifiers 804 may include one or more attributes 806 associated with the ML models, including a relative effects, or causal conversion rate associated with the selected ML models.

In some embodiments, the GUI 802 may additionally include a visualization of a comparison of the selected ML models, wherein the visualization may include a bar graph.

Data Communications Architecture

Figure 9:
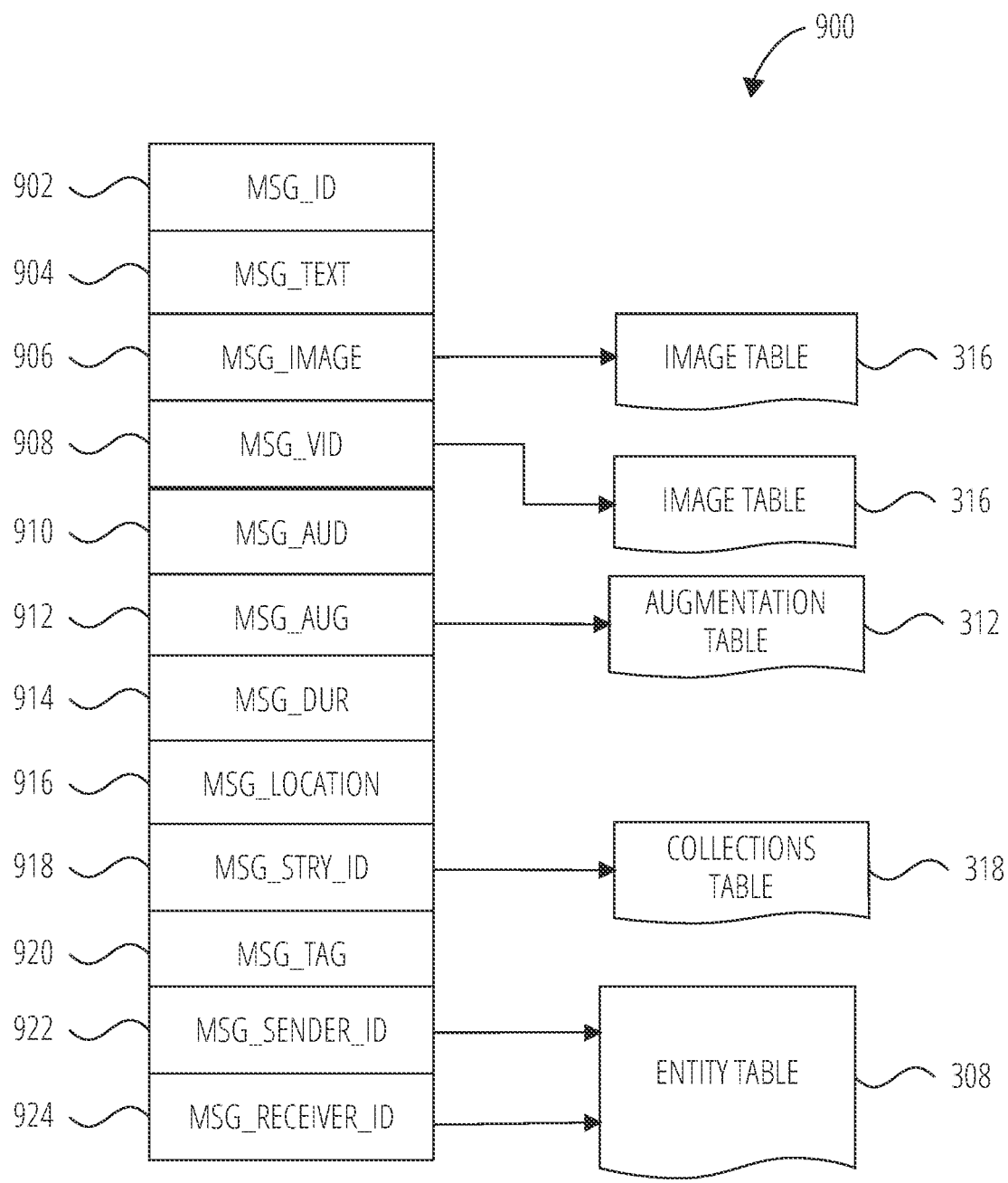
FIG. 9 is a diagrammatic representation of a message, according to some examples.

FIG. 9 is a schematic diagram illustrating a structure of a message 900, according to some examples, generated by an interaction client 104 for communication to a further interaction client 104 via the interaction servers 124. The content of a particular message 900 is used to populate the message table 306 stored within the database 304, accessible by the interaction servers 124. Similarly, the content of a message 900 is stored in memory as "in-transit" or "in-flight" data of the user system 102 or the interaction servers 124. A message 900 is shown to include the following example components:

- Message identifier 902: a unique identifier that identifies the message 900.
- Message text payload 904: text, to be generated by a user via a user interface of the user system 102, and that is included in the message 900.
- Message image payload 906: image data, captured by a camera component of a user system 102 or retrieved from a memory component of a user system 102, and that is included in the message 900. Image data for a sent or received message 900 may be stored in the image table 316.
- Message video payload 908: video data, captured by a camera component or retrieved from a memory component of the user system 102, and that is included in the message 900. Video data for a sent or received message 900 may be stored in the image table 316.
- Message audio payload 910: audio data, captured by a microphone or retrieved from a memory component of the user system 102, and that is included in the message 900.
- Message augmentation data 912: augmentation data (e.g., filters, stickers, or other annotations or enhancements) that represents augmentations to be applied to message image payload 906, message video payload 908, or message audio payload 910 of the message 900. Augmentation data for a sent or received message 900 may be stored in the augmentation table 312.
- Message duration parameter 914: parameter value indicating, in seconds, the amount of time for which content of the message (e.g., the message image payload 906, message video payload 908, message audio payload 910) is to be presented or made accessible to a user via the interaction client 104.
- Message geolocation parameter 916: geolocation data (e.g., latitudinal and longitudinal coordinates) associated with the content payload of the message. Multiple message geolocation parameter 916 values may be included in the payload, each of these parameter values being associated with respect to content items included in the content (e.g., a specific image within the message image payload 906, or a specific video in the message video payload 908).
- Message story identifier 918: identifier values identifying one or more content collections (e.g., "stories" identified in the collections table 318) with which a particular content item in the message image payload 906 of the message 900 is associated. For example, multiple images within the message image payload 906 may each be associated with multiple content collections using identifier values.
- Message tag 920: each message 900 may be tagged with multiple tags, each of which is indicative of the subject matter of content included in the message payload. For example, where a particular image included in the message image payload 906 depicts an animal (e.g., a lion), a tag value may be included within the message tag 920 that is indicative of the relevant animal. Tag values may be generated manually, based on user input, or may be automatically generated using, for example, image recognition.
- Message sender identifier 922: an identifier (e.g., a messaging system identifier, email address, or device identifier) indicative of a user of the user system 102 on which the message 900 was generated and from which the message 900 was sent.
- Message receiver identifier 924: an identifier (e.g., a messaging system identifier, email address, or device identifier) indicative of a user of the user system 102 to which the message 900 is addressed.

The contents (e.g., values) of the various components of message 900 may be pointers to locations in tables within which content data values are stored. For example, an image value in the message image payload 906 may be a pointer to (or address of) a location within an image table 316. Similarly, values within the message video payload 908 may point to data stored within an image table 316, values stored within the message augmentation data 912 may point to data stored in an augmentation table 312, values stored within the message story identifier 918 may point to data stored in a collections table 318, and values stored within the message sender identifier 922 and the message receiver identifier 924 may point to user records stored within an entity table 308.

Machine Architecture

Figure 10:
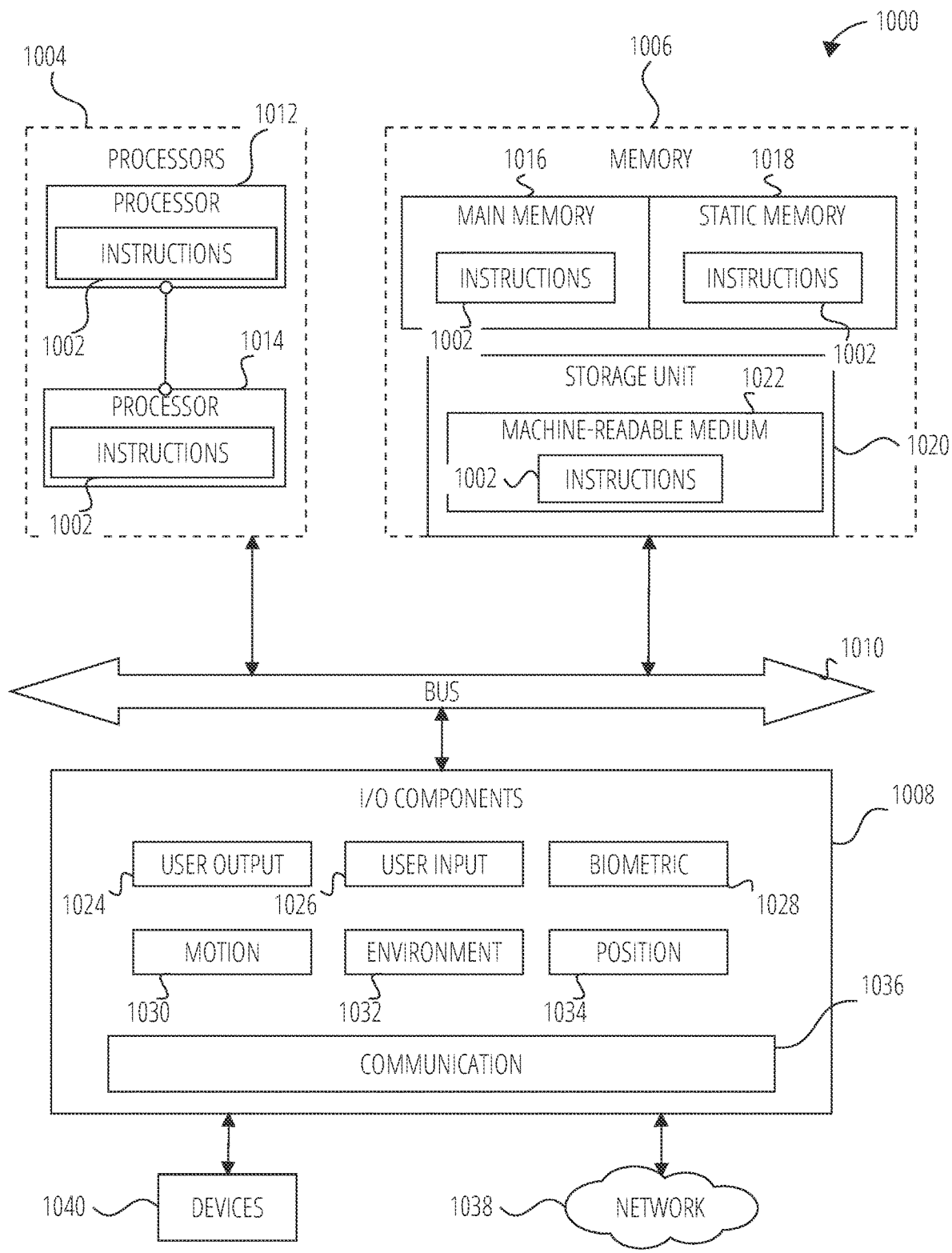
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including.
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
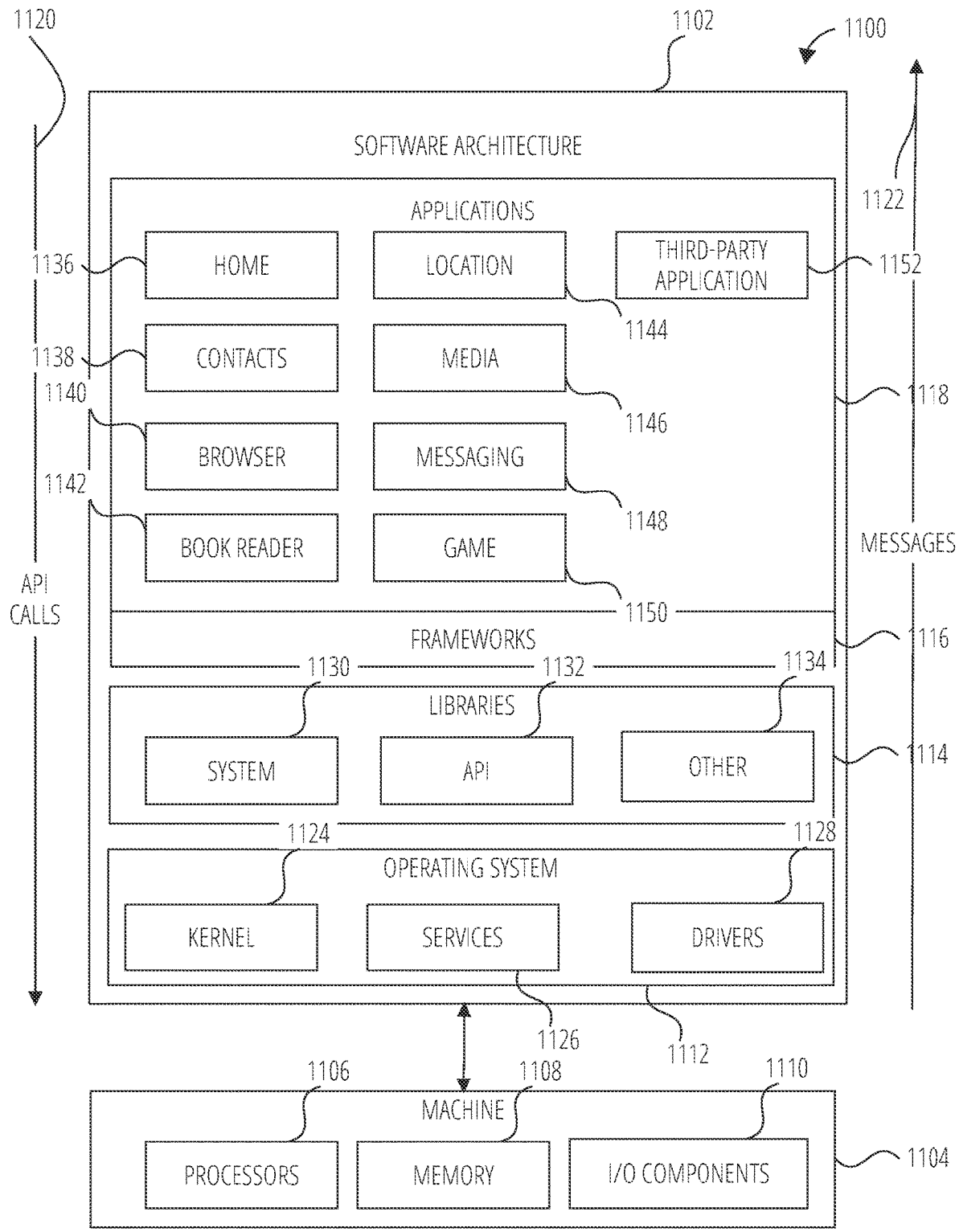
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

Examples

Example 1 is a method comprising: accessing first user behavior data associated with a first ML model and second user behavior data associated with a second ML model, the first ML model associated with a first identifier and the second ML model associated with a second identifier; determining a first set of causal conversions associated with the first ML model based on the first user behavior data, the first set of causal conversions comprising a first value; determining a second set of causal conversions associated with the second ML model based on the second user behavior data, the second set of causal conversions comprising a second value; performing a comparison between the first value that represents the first set of causal conversions and the second value that represents the second set of causal conversions; determining a ranking of the first ML model and the second ML model based on the comparison; and causing display of a GUI that includes, a display of the first identifier associated with the first ML model and the second identifier associated with the second ML model based on the ranking.

In Example 2, the subject matter of Example 1 includes, wherein the accessing the first user behavior data associated with the first ML model and the second user behavior data associated with the second ML model includes: causing display of one or more menu elements within the GUI, the one or more menu elements including a display of a set of identifiers that includes at least the first identifier and the second identifier; receiving inputs that select the first identifier and the second identifier from the one or more menu elements; and accessing the first user behavior data and the second user behavior data based on the inputs.

In Example 3, the subject matter of Examples 1-2 includes, wherein the display of the first identifier includes the first value and the display of the second identifier includes the second value.

In Example 4, the subject matter of Examples 1-3 includes, wherein the GUI includes a visualization of the first value and the second value, the visualization including a bar graph.

In Example 5, the subject matter of Examples 1-4 includes, wherein the determining the first set of causal conversions associated with the first ML model and the second set of causal conversions associated with the second ML model includes: accessing a matching service that identifies conversion events based on the first user behavior data and the second user behavior data; and determining the first set of causal conversions and the second set of causal conversions based on the matching service.

In Example 6, the subject matter of Examples 1-5 includes, wherein the first ML model corresponds with a campaign, the second ML model comprises an update to the first ML model, and the method further comprises: determining the second value that represents the second set of causal conversions is greater than the first value that represents the first set of causal conversions; and applying the second ML model to the campaign based on the determining the second value is greater than the first value.

In Example 7, the subject matter of Examples 1-6 includes, wherein the performing the comparison between the first value that represents the first set of causal conversions and the second value that represents the second set of causal conversions includes: performing an A/B test based on the first user behavior data and the second user behavior data.

Example 8 is at least one machine-readable medium including instructions that, when executed by processing circuitry, cause the processing circuitry to perform operations to implement of any of Examples 1-7.

Example 9 is an apparatus comprising means to implement of any of Examples 1-7.

Example 10 is a system to implement of any of Examples 1-7.

Example 11 is a method to implement of any of Examples 1-7.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data.

The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:
   at least one processor;
   at least one memory component storing instructions that, when executed by the at least one processor, cause the at least one processor to perform operations comprising:
   causing display of a menu element at a client device, the menu element including a display of a set of identifiers that include a first identifier that identifies a first machine-learned (ML) model, and a second identifier that identifies a second ML model;
   receiving tactile inputs at the client device that select the first identifier and the second identifier;
   accessing first user behavior data associated with the first ML model and second user behavior data associated with the second ML model from within a database responsive to the inputs that select the first identifier and the second identifier;
   determining a first set of causal conversions associated with the first ML model based on the first user behavior data, the first set of causal conversions comprising a first value;
   determining a second set of causal conversions associated with the second ML model based on the second user behavior data, the second set of causal conversions comprising a second value;
   performing a comparison between the first value that represents the first set of causal conversions and the second value that represents the second set of causal conversions;
   determining a ranking of the first ML model and the second ML model based on the comparison; and
   selecting a highest ranked ML model based on the ranking; and
   identifying a set of candidate users to include in a media distribution campaign based on the highest ranked ML model.

2. The system of claim 1, wherein the display of the first identifier includes the first value and the display of the second identifier includes the second value.

3. The system of claim 1, wherein the GUI includes a visualization of the first value and the second value, the visualization including a bar graph.

4. The system of claim 1, wherein the determining the first set of causal conversions associated with the first ML model and the second set of causal conversions associated with the second ML model includes:
   accessing a matching service that identifies conversion events based on the first user behavior data and the second user behavior data; and
   determining the first set of causal conversions and the second set of causal conversions based on the matching service.

5. The system of claim 1, wherein the first ML model corresponds with a campaign, the second ML model comprises an update to the first ML model, and the method further comprises:
   determining the second value that represents the second set of causal conversions is greater than the first value that represents the first set of causal conversions; and
   applying the second ML model to the campaign based on the determining the second value is greater than the first value.

6. The system of claim 1, wherein the performing the comparison between the first value that represents the first set of causal conversions and the second value that represents the second set of causal conversions includes:
   performing an A/B test based on the first user behavior data and the second user behavior data.

7. A method comprising:
   causing display of a menu element at a client device, the menu element including a display of a set of identifiers that include a first identifier that identifies a first machine-learned (ML) model, and a second identifier that identifies a second ML model;
   receiving tactile inputs at the client device that select the first identifier and the second identifier;
   accessing first user behavior data associated with the first ML model and second user behavior data associated with the second ML model from within a database responsive to the inputs that select the first identifier and the second identifier;
   determining a first set of causal conversions associated with the first ML model based on the first user behavior data, the first set of causal conversions comprising a first value;
   determining a second set of causal conversions associated with the second ML model based on the second user behavior data, the second set of causal conversions comprising a second value;

performing a comparison between the first value that represents the first set of causal conversions and the second value that represents the second set of causal conversions;

determining a ranking of the first ML model and the second ML model based on the comparison; and selecting a highest ranked ML model based on the ranking; and identifying a set of candidate users to include in a media distribution campaign based on the highest ranked ML model.

8. The method of claim 7, wherein the display of the first identifier includes the first value and the display of the second identifier includes the second value.

9. The method of claim 7, wherein the GUI includes a visualization of the first value and the second value, the visualization including a bar graph.

10. The method of claim 7, wherein the determining the first set of causal conversions associated with the first ML model and the second set of causal conversions associated with the second ML model includes:

accessing a matching service that identifies conversion events based on the first user behavior data and the second user behavior data; and determining the first set of causal conversions and the second set of causal conversions based on the matching service.

11. The method of claim 7, wherein the first ML model corresponds with a campaign, the second ML model comprises an update to the first ML model, and the method further comprises:

determining the second value that represents the second set of causal conversions is greater than the first value that represents the first set of causal conversions; and applying the second ML model to the campaign based on the determining the second value is greater than the first value.

12. The method of claim 8, wherein the performing the comparison between the first value that represents the first set of causal conversions and the second value that represents the second set of causal conversions includes:

performing an A/B test based on the first user behavior data and the second user behavior data.

13. A non-transitory computer-readable storage medium storing instructions that, when executed by at least one processor, cause the at least one processor to perform operations comprising:

causing display of a menu element at a client device, the menu element including a display of a set of identifiers that include a first identifier that identifies a first machine-learned (ML) model, and a second identifier that identifies a second ML model;

receiving tactile inputs at the client device that select the first identifier and the second identifier;

accessing first user behavior data associated with the first ML model and second user behavior data associated with the second ML model from within a database responsive to the inputs that select the first identifier and the second identifier;

determining a first set of causal conversions associated with the first ML model based on the first user behavior data, the first set of causal conversions comprising a first value;

determining a second set of causal conversions associated with the second ML model based on the second user behavior data, the second set of causal conversions comprising a second value;

performing a comparison between the first value that represents the first set of causal conversions and the second value that represents the second set of causal conversions;

determining a ranking of the first ML model and the second ML model based on the comparison; and selecting a highest ranked ML model based on the ranking; and identifying a set of candidate users to include in a media distribution campaign based on the highest ranked ML model.

14. The non-transitory computer-readable storage medium of claim 13, wherein the display of the first identifier includes the first value and the display of the second identifier includes the second value.

15. The non-transitory computer-readable storage medium of claim 13, wherein the GUI includes a visualization of the first value and the second value, the visualization including a bar graph.

16. The non-transitory computer-readable storage medium of claim 13, wherein the determining the first set of causal conversions associated with the first ML model and the second set of causal conversions associated with the second ML model includes:

accessing a matching service that identifies conversion events based on the first user behavior data and the second user behavior data; and determining the first set of causal conversions and the second set of causal conversions based on the matching service.

17. The non-transitory computer-readable storage medium of claim 13, wherein the first ML model corresponds with a campaign, the second ML model comprises an update to the first ML model, and the method further comprises:

determining the second value that represents the second set of causal conversions is greater than the first value that represents the first set of causal conversions; and applying the second ML model to the campaign based on the determining the second value is greater than the first value.

* * * * *